United States Patent
Choi et al.

(10) Patent No.: US 9,363,363 B2
(45) Date of Patent: *Jun. 7, 2016

(54) METHOD FOR CONTROLLING MOBILE TERMINAL HAVING PROJECTION FUNCTION BY USING HEADSET

(71) Applicant: Samsung Electronics Co., Ltd., Gyeonggi-do (KR)

(72) Inventors: Young Il Choi, Gyeonggi-do (KR); Myoung Dae Jin, Gyeonggi-do (KR); Sung Bae Kim, Gyeonggi-do (KR); Bo Sung Kim, Gyeonggi-do (KR); Tae Young Kim, Gyeonggi-do (KR); Phil Jun Kim, Seoul (KR); Young Ho Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,808

(22) Filed: Aug. 20, 2014

(65) Prior Publication Data

US 2014/0357243 A1 Dec. 4, 2014

Related U.S. Application Data

(63) Continuation of application No. 12/699,165, filed on Feb. 3, 2010, now Pat. No. 8,825,038.

(30) Foreign Application Priority Data

Feb. 5, 2009 (KR) ........................ 10-2009-0009494

(51) Int. Cl.
*H04M 3/00* (2006.01)
*H04M 1/725* (2006.01)

(Continued)

(52) U.S. Cl.
CPC ........ *H04M 1/72597* (2013.01); *H04M 1/6066* (2013.01); *H04M 1/7253* (2013.01); *H04M 3/436* (2013.01); *H04N 9/3173* (2013.01);
(Continued)

(58) Field of Classification Search
CPC .................................................. H04M 1/72597
See application file for complete search history.

(56) References Cited

U.S. PATENT DOCUMENTS

| 2006/0146774 | A1 | 7/2006 | Kim et al. |
| 2006/0203998 | A1 | 9/2006 | Ben-Arie |
| 2007/0207735 | A1* | 9/2007 | Jin ............................... 455/41.2 |
| 2008/0039072 | A1* | 2/2008 | Bloebaum ..................... 455/425 |
| 2008/0154610 | A1 | 6/2008 | Mahlbacher |

FOREIGN PATENT DOCUMENTS

| CN | 2904481 Y | 5/2007 |
| EP | 1 170 922 A1 | 1/2002 |

(Continued)

OTHER PUBLICATIONS

"Specification of the Bluetooth System, Profiles, Version 1.1, Part K:6: Headset Profile"; Specification of the Bluetooth System; Feb. 22, 2001; XP0022777008.

*Primary Examiner* — Justin Lee
(74) *Attorney, Agent, or Firm* — Cha & Reiter, LLC

(57) ABSTRACT

Provided is a method of controlling a portable terminal having a projector module using a headset, which includes: receiving a command signal from the headset; determining whether the projector module is in an execution or driving state; recognizing the command signal as a signal for controlling the projector module, in case the projector module is in the driving state; and controlling the projector module according to the recognized signal.

16 Claims, 5 Drawing Sheets

(51) Int. Cl.
*H04M 1/60* (2006.01)
*H04N 9/31* (2006.01)
*H04M 3/436* (2006.01)
*H04W 4/16* (2009.01)
*H04M 1/02* (2006.01)

(52) U.S. Cl.
CPC .............. *H04W 4/16* (2013.01); *H04M 1/0272* (2013.01); *H04M 2250/02* (2013.01)

(56) References Cited

FOREIGN PATENT DOCUMENTS

| EP | 1 924 090 A1 | 5/2008 |
|---|---|---|
| WO | 2008/018918 A1 | 2/2008 |
| WO | 2008/117098 A1 | 10/2008 |

\* cited by examiner

METHOD FOR CONTROLLING MOBILE TERMINAL HAVING PROJECTION FUNCTION BY USING HEADSET

CROSS REFERENCE TO RELATED APPLICATIONS

The present application is a Continuation of U.S. patent application Ser. No. 12/699,165 filed on Feb. 3, 2010 which claims the benefit of priority from an earlier application entitled "METHOD FOR CONTROLLING MOBILE TERMINAL HAVING PROJECTION FUNCTION BY USING HEADSET", filed in the Korean Intellectual Property Office on Feb. 5, 2009 and assigned Ser. No. 10-2009-0009494, the contents of which are incorporated herein by reference in its entirety.

BACKGROUND

1. Field of the Invention

The present invention relates to a method for controlling a portable terminal, and more particularly, to a method for controlling a portable terminal having a projector function using a headset.

2. Description of the Related Art

Today, a portable terminal is transfigured into a multimedia communications function device since it can provide not only its own voice call service but also various data transmission services and additional services. Recently, a portable terminal equipped with a projector module is developed. Users can project an image to screen via the portable terminal, so that people can share various video data stored in the portable terminal. Therefore, by using the portable terminal, users can hold a meeting that requires projector anytime and anywhere.

It is necessary to make the portable terminal body to be fixed to a certain location so that the portable terminal can smoothly perform the projector function. However, when the portable terminal is fixed to an odd or unreachable location (e.g., a location higher than the height of user), it is uncomfortable for a user to input a command via the portable terminal.

Accordingly, there is a need for an improved way of controlling a portable terminal with a projector function using a headset.

SUMMARY

The present invention has been made in view of the above problems and provides additional advantages, by providing a method of controlling a portable terminal having a projector function via a headset. The present invention further provides a portable terminal using such a method.

In accordance with one embodiment of the present invention, a method of controlling a portable terminal having a projector module using a headset includes: receiving a command signal from the headset; determining whether the projector module is in a driving state; recognizing the command signal as a signal for controlling the projector module when the projector module is in the driving state; and controlling the projector module according to the recognized signal.

In accordance with another embodiment of the present invention, a method of controlling a portable terminal having a projector module using a headset includes: receiving a call in a state where the projector module is driven; checking a call processing mode which is predefined in the portable terminal; informing a reception of call to the headset; and performing a connection with the received call in case of receiving a call connection command from the headset.

In accordance with another embodiment of the present invention, a portable terminal includes: a projector module unit which projects at least one image contents stored in the portable terminal to screen; a headset communications unit which performs a wire/wireless communication with at least one headset; and a controller which determines whether the projector module unit is in a driving state when receiving a command signal from the headset, recognizes the command signal as a control signal of the projector module unit when the projector module unit is in the driving state, and controls the projector module unit according to the recognized signal.

In accordance with another embodiment of the present invention, a portable terminal includes: a projector module unit which projects at least one image contents stored in the portable terminal to screen; a headset communications unit which performs a wire/wireless communication with at least one headset; a wireless communications unit which performs the reception and connection function of a call; and a controller which confirms a call processing mode which is predefined in the portable terminal and informs a call receipt to the headset when receiving a call through the wireless communications unit, and performs a connection with the received call by controlling the wireless communications unit when receiving a call connection command from the headset.

According to the present invention, users can easily control the projector function by a headset, and can easily execute other functions equipped in the portable terminal during the execution of projector function.

BRIEF DESCRIPTION OF THE DRAWINGS

The above features and advantages of the present invention will be more apparent from the following detailed description in conjunction with the accompanying drawings, in which.

DETAILED DESCRIPTION

Hereinafter, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

A portable terminal according to the embodiments of the present invention can be applied to all information telecommunication related devices, multimedia devices, and applications thereof, such as a mobile communications terminal, a portable multimedia player (PMP), a personal data assistant (PDA), a Smart phone, and a MP3 player or the like.

Figure 1:
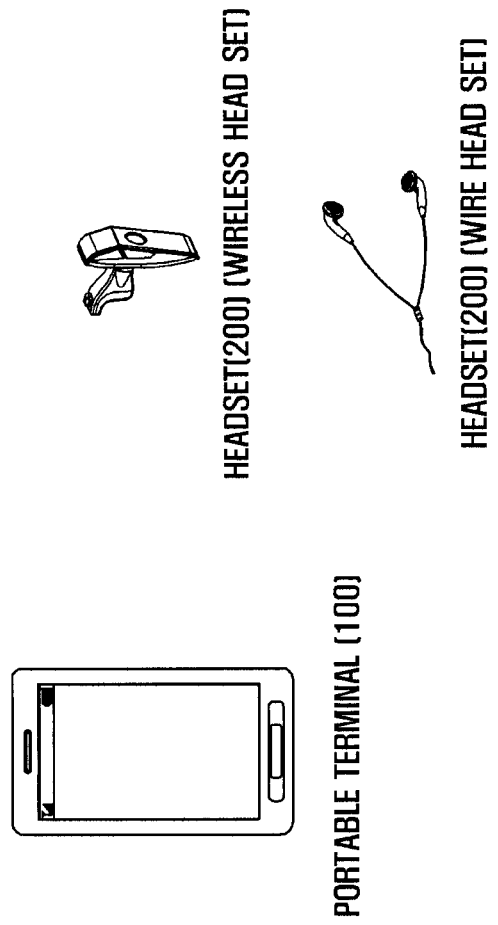
FIG. 1 is a drawing illustrating a portable terminal equipped with a projector module and a headset according to an exemplary embodiment of the present invention.

FIG. 1 is a drawing illustrating a portable terminal 100 equipped with a projector module and a headset 200 according to an exemplary embodiment of the present invention.

As shown, the portable terminal 100 includes a projector module in communication with the headset 200. In case the headset 200 is configured in the form of a wire headset, the headset 200 and the portable terminal 100 can be connected by a connector of the headset 200 with a headset connection unit equipped in the portable terminal 100. A key input unit may be equipped in the headset 200, and can be formed with various forms according to the types of the headset 200. For instance, the key input unit of the headset 200 can be formed with one key, or can be formed with two or more keys. In case the headset 200 is a wireless headset, the headset 200 and the portable terminal 100 performs wireless communication, and transmits and receives data signal including a voice signal and a control signal or the like.

A short-range wireless communication method is used to transmit and receive data signals between the headset 200 and the portable terminal 100. In the embodiment, a Bluetooth technology is used as a short-range wireless communication. However, note that other representative short-range wireless communication includes infrared communications (IrDA) and Zigbee or the like. In addition, various other wireless communications method which can form a communications channel to transmit and receive a signal can be applied.

The Bluetooth communications method uses the ISM (Industrial Scientific Medical) band of 2.4 GHz band. The ISM band can be freely used without a separate license. In order to prevent interference with other devices, the Bluetooth communications method provides a guard band, which is a 2 MHz band under the ISM band and a 3.5 MHz band over the ISM band. A frequency hopping method is typically used in the Bluetooth communications method.

In operation, if the portable terminal 100 broadcasts an inquiry signal, the headset 200 performing an inquiry and transmits an inquiry response in response to the inquiry signal to the portable terminal 100. After broadcasting the inquiry signal and receiving the inquiry response from the headset 200, the portable terminal 100 can determine neighboring blue tooth communications devices. If a specific headset (headset 200) is selected from an inquired Bluetooth device list, the portable terminal 100 transmits a page signal to the headset 200. The headset 200 performing a page scan and transmits a slave response to the portable terminal 100 in response to the page signal.

The portable terminal 100 transmits a master response to the headset 200. The portable terminal 100 sets up a communication channel with the headset 200 through a page process. And if a pin code is inputted by user, the portable terminal 100 performs a connection with the headset 200. Then, if the connection is completed, the portable terminal 100 and the headset 200 can perform the Bluetooth communications.

Figure 2:
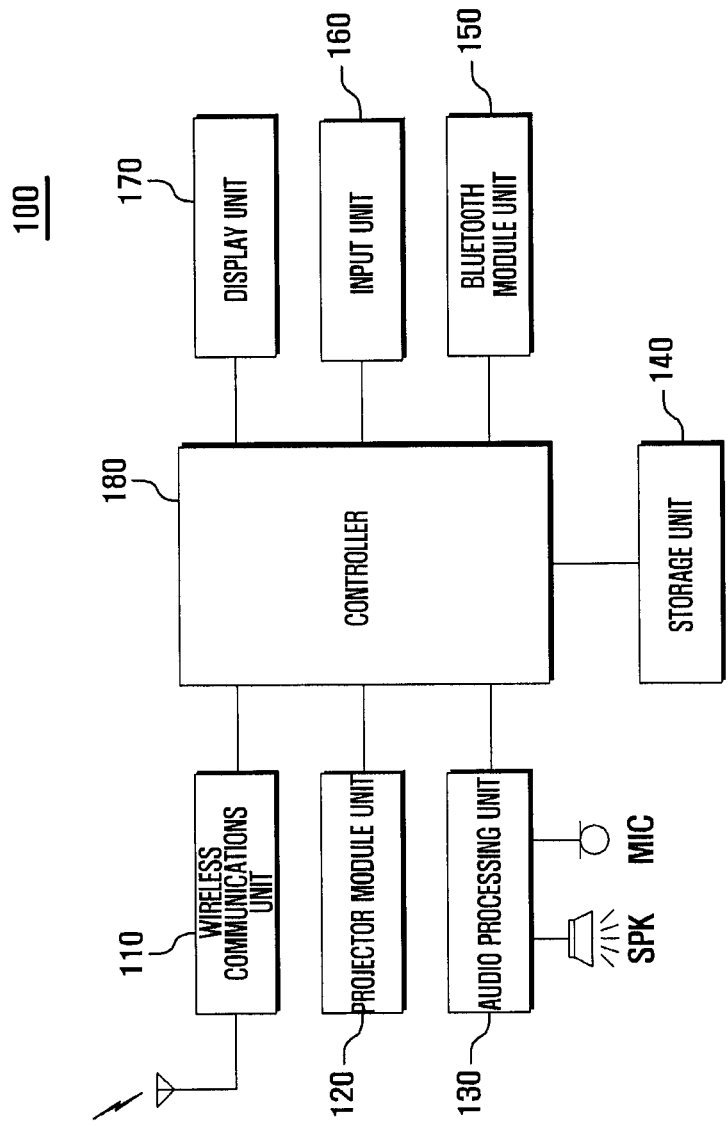
FIG. 2 is a block diagram illustrating a configuration of a portable terminal 100 according to an exemplary embodiment of the present invention.

FIG. 2 is a block diagram illustrating a configuration of a portable terminal 100 according to an exemplary embodiment of the present invention.

As shown, a wireless communications unit 110 performs the transceive function of corresponding data for the wireless communications of the portable terminal 100. The wireless communications unit 110 can be configured of a RF transmitter which up-converts and amplifies a frequency of a transmitted signal, and a RF receiver which low-noise amplifies a received signal and down-converts the frequency. Moreover, the wireless communications unit 110 receives data through a wireless channel and outputs the received data to a controller 180, and can transmit data outputted from the controller 180 through the wireless channel. A projector module unit 120 serves to perform the projection function by enlarging and projecting video contents stored in the portable terminal 100 such as picture, photograph, and document or the like, on a screen. The audio processing unit 130 can be configured of a codec. The codec includes a data codec which processes packet data, and an audio codec which processes an audio signal such as voice.

An audio processing unit 130 converts a digital audio signal into an analog audio signal through the audio codec and plays through a speaker (SPK), and converts the analog audio signal inputted from a microphone (MIC) into a digital audio signal through the audio codec. The audio processing unit 130 according to an exemplary embodiment of the present invention can output corresponding sound effects, when the portable terminal 100 receives a call from other portable terminal.

A storage unit 140 stores a program and data necessary for the operation of the portable terminal 100, and can be classified into a program area and a data area. The storage unit 140 according to an embodiment of the present invention stores information about a call processing mode set by user. The call processing mode can include a call connection mode, a call interrupt mode, and a projector simultaneous execution mode. When a user selects one of the call processing modes from a call processing mode setting menu, the storage unit 140 stores setting information relating to the selected call processing mode. A Bluetooth module unit 150 performs the role of transmitting and receiving data signal such as voice signal and control signal or the like with another instrument equipped with a Bluetooth technology via a wireless interface. The Bluetooth module unit 150 according to an embodiment of the present invention performs the Bluetooth communications with the headset 200.

The Bluetooth module unit 150 receives the AT command indicative of a command signal from the headset 200, and transmits to the controller 180. Moreover, according to the embodiment of the present invention, in case the portable terminal 100 receives a call from another portable terminal, the Bluetooth module unit 150 transmits a signal which informs that the call was received to the headset 200 under the control of the controller 180. An input unit 160 receives a key operation signal from the user for controlling the portable terminal 100 and sends the key operation signal to the controller 180. The input unit 160 can be configured of a keypad including a numeric key and a direction key. Alternatively, the input unit 160 can be configured of a touch pad. Moreover, in case of the portable terminal equipped with an image sensor or an acceleration sensor, the sensors can also perform the role of the input unit 160.

The display unit 170 can be formed with a LCD (Liquid Crystal Display), and visually provides a menu, an inputted data, function setting information, and other various information of the portable terminal 100. For instance, the display unit 170 performs the function of outputting a booting screen, a stand-by screen, a display screen, a call screen, and other application execution screen of the portable terminal 100. When the projector module unit 120 projects image to screen, the display unit 170 according to an embodiment of the present invention can display the same screen as the projected image.

The controller 180 controls the overall operation of the portable terminal and a signal flow between internal blocks of the portable terminal shown in FIG. 2. The controller 180 according to an embodiment of the present invention performs the role of controlling the Bluetooth module unit 150 and receiving the AT command corresponding to the command signal from the headset 200. If the controller 180 receives a command signal (AT command) from the headset 200, the controller 180 checks whether the current projector application is in an execution state. In case the current projector application is in the execution state, the controller 180 recognizes the command signal (AT command) received from the headset 200 as a signal of controlling the projector application. In case the current projector application is not in the execution state, the controller 180 can recognize the command signal (AT command) as a normal call connection command signal.

The controller 180 according to another exemplary embodiment of the present invention performs the role of setting up a call processing mode. In case the controller 180 receives a call through the wireless communications unit 110, it performs the role of checking the set up call processing mode. Moreover, the controller 180 controls the Bluetooth module unit 150 to transmit a signal which informs the call reception to the headset 200. When the controller 180 controls the Bluetooth module unit 150 to receive the call connection command signal from the headset 200, it controls the wireless communications unit 110 to perform connection with the received call. Until now, the configuration of the portable terminal 100 equipped with a projector module was illustrated, and hereinafter, the method for controlling the portable terminal 100 by a headset is illustrated.

Figure 3:
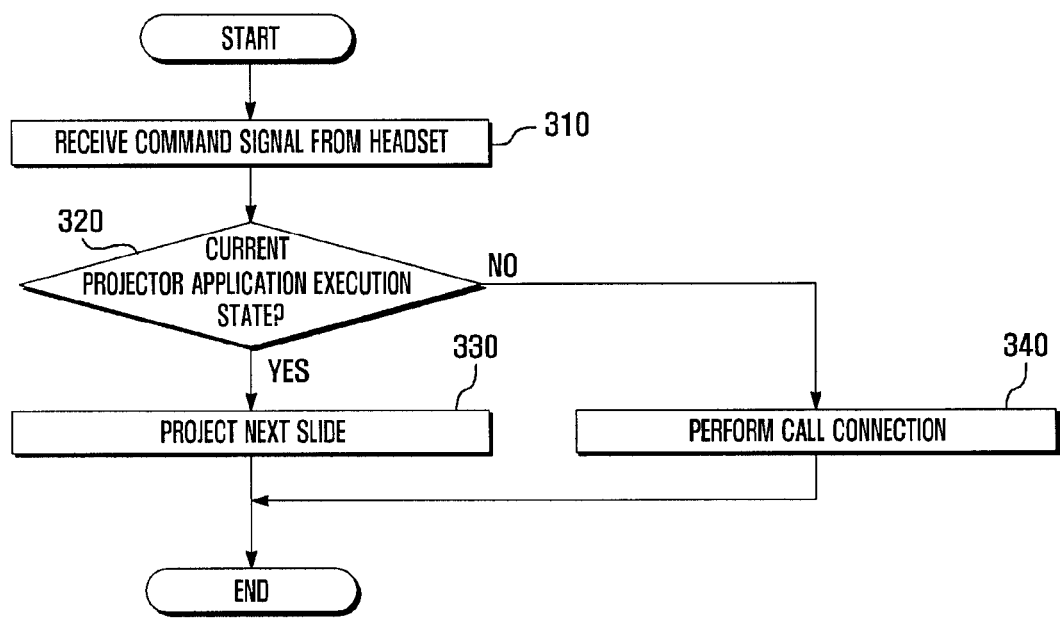
FIG. 3 is a flowchart illustrating a process of controlling a portable terminal equipped with a projector module with a headset according to a first embodiment of the present invention.

FIG. 3 is a flowchart illustrating operation process of controlling a portable terminal equipped with a projector module with a headset according to a first embodiment of the present invention.

In a first embodiment of the present invention, it is assumed that the portable terminal 100 performs the connection process with headset 200 after the inquiry and the page process, and the portable terminal 100 corresponds to the state where the portable terminal 100 can perform Bluetooth communications with the headset 200. In case the headset 200 corresponds to a wire headset, it is assumed that a connector of the headset 200 and a connection unit of the portable terminal 100 are in communication, so that the headset 200 can transmit a voice signal or a control signal to the portable terminal 100. The controller 180 receives a command signal from the headset 200 through the Bluetooth module unit 150 (310). The HFP (HandsFreeProfile) may be used as a protocol for communications between the portable terminal 100 and the headset 200. The headset 200 having the HFP function transmits the AT command which is defined in order to control portable terminal or modem to the portable terminal 100. Generally, the headset 200 uses AT+BVRA or AT+BLDN among the AT command. The headset 200 distinguishes the AT+BVRA signal and the AT+BLDN signal and transmits to the portable terminal 100. The method of transmitting the AT+BVRA signal and the AT+BLDN signal can be differentiated according to the types of the headset 200. A key input unit which can receive an input of user is equipped in the headset 200. If a user inputs a key, the headset 200 transmits the AT command to the Bluetooth module unit 150. According to the embodiment of the present invention, the user can select between AT+BVRA and AT+BLDN signals and transmit the selected signal to the portable terminal 100, by changing the time of inputting or the number of times of inputting.

As described in the above, only AT+BVRA and AT+BLDN were illustrated as an example of the AT command. However, it is not limited to this, but all other AT commands defined between the portable terminal 100 and the headset 200 and known by artisians can be used for the present invention. If the user inputs a certain key equipped in the headset 200 when the headset 200 is configured of a wire headset, the headset 200 transmits a command signal to the portable terminal 100. According to the number of keys equipped in the key input unit of the headsets, the user can selectively input a key corresponds to a desired function. The headset 200 detects the key which the user inputs and a key input time, and transmits the command signal to the portable terminal 100. If the command signal is received from the headset 200, the controller 180 determines whether the current projector application is in the execution state or driving state (320). As a result of the determination, in case the current projector application is in the execution state, the controller 180 recognizes the command signal received from the headset 200 as a command signal controlling the projector application, and controls the projector module unit 120 to project the next slide of a slide which is currently projected according to a predefined order, to screen (330). That is, when a user inputs a key of headset 200, the controller 180 determines whether the projector application is in the execution state, and if so, controls projection module unit 120 to project the next slide.

In the embodiment of the present invention, displaying the next slide according to the predefined slide order is just one illustrative embodiment, the controller 180 can perform various functions of the projector application according to the type of the command signal which is received from the headset 200. For example, in case the user inputs key equipped in the headset 200 for a long time and the headset 200 transmits a corresponding command signal to the Bluetooth module unit 150, the controller 180 can terminate the projector application which is being executed according to the function defined in the portable terminal 100. The controller 180 terminates the drive of the projector module unit 120 according to the termination of the drive of the projector application.

In case the headset 200 is configured of a wire headset, the controller 180 can perform the next slide projection, the previous slide projection, the continuous view (slide show) function execution or the like according to the type of command signal received from the headset 200. In case a plurality of keys is equipped in the headset 200, the user can input key, and in response, the headset 200 can transmit a different command signal for each key input to the portable terminal 100. As a result of determination in step 320, in case the current projector application is not in the execution state, the controller 180 controls the wireless communications unit 110 and performs the call connection (340). Generally, in a standby state screen, if AT+BVRA is received from the headset 200, the portable terminal 100 performs the call connection function. That is, the controller 180 determines whether the current projector application is in the execution state. If the current projector application is not in the execution state, the controller 180 performs a normal call connection function to exchange voice and/or data. In case the portable terminal 100 receives a command signal from the headset 200 when executing other application which is not a stand-by screen application, the portable terminal 100 performs the function corresponding to application which is being executed.

In the first embodiment of the present invention, when the command signal was received from the headset 200, in case the projector application is in the execution state, the received command signal is recognized as a command signal controlling the projector application, whereas in case the projector application is not in the execution state, the received command signal is recognized as a command signal for performing function which is generally defined function, so that the user can control the projector function of the portable terminal by using the headset 200.

Figure 4:
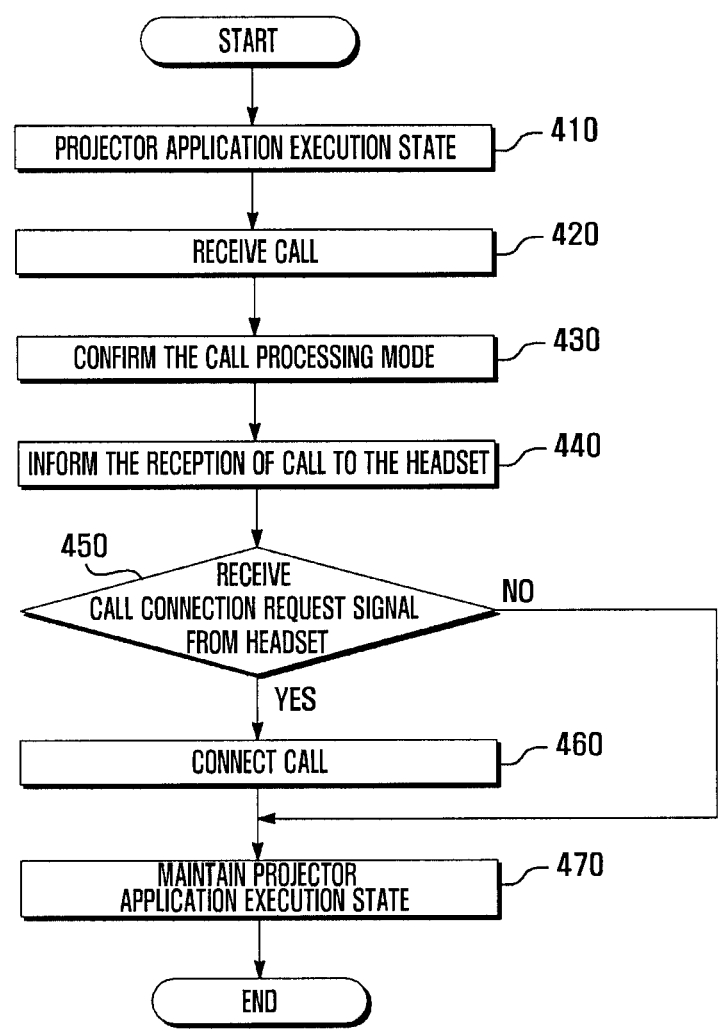
FIG. 4 is a flowchart illustrating a process of controlling a portable terminal equipped with a projector module with a headset according to a second embodiment of the present invention.

FIG. 4 is a flowchart illustrating a process of controlling a portable terminal equipped with a projector module with a headset according to a second embodiment of the present invention.

In the second embodiment of the present invention, it is assumed that the portable terminal 100 performs the connection process with headset 200 after the inquiry and the page process, and the portable terminal 100 corresponds to the state where the portable terminal 100 can perform Bluetooth communications with the headset 200. In case the headset 200 corresponds to a wire headset, it is assumed that a connector of the headset 200 and a connection unit of the portable terminal 100 are in communication so that the headset 200 can transmit a voice signal or a control signal to the portable terminal 100. The controller 180 executes the projector application, and controls the projector module unit 120 to project image contents stored in the storage unit 140 to screen (410). In the state where the controller 180 executes the projector application, the wireless communications unit 110 receives the call (420). The wireless communications unit 110 informs the controller 180 that the call is received. The controller 180 confirms the set call processing mode (430). The call processing mode is previously set by a user. The user can set the call processing mode through a general menu equipped in the portable terminal 100 or a user setting menu. The call processing mode includes the call connection mode, the call interrupt mode, and the projector simultaneous execution mode.

Figure 5:
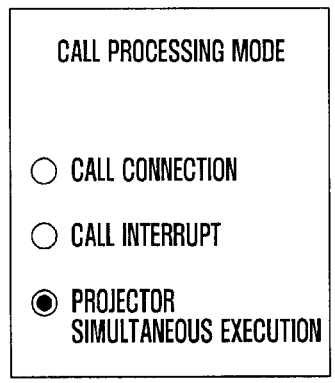
FIG. 5 is a drawing illustrating a call processing mode setting menu according to the embodiment of the present invention.

FIG. 5 is a drawing illustrating a call processing mode setting menu. It is assumed that the projector simultaneous execution mode is set as a call processing mode in FIG. 5.

The controller 180 confirms that the call processing mode is set as a projector simultaneous execution mode (430), and controls the Bluetooth module unit 150 to transmit a signal which informs that the call is received, to the headset 200 (440). The controller 180 can control the headset 200 to output sound effects corresponding to the generation of an incoming call is received when transmitting a signal to the headset 200. A user can listen the sound effects received from the headset 200 and can distinguish whether the incoming call to make signal indicative of a call connection. The user can select whether to connect the call by using the input unit equipped in the headset 200. If the user inputs key corresponding to the call connection, the headset 200 transmits a call connection request signal (command signal) to the Bluetooth module unit 150. The Bluetooth module unit 150 receives the call connection request signal (command signal) and transmits the signal to the controller 180. The controller 180 determines whether the call connection request signal is received from the headset 200 (450). In case the call connection request signal is received, the controller 180 controls the wireless communications unit 110 and connects the call (460). Thereafter, the controller 180 continuously maintains the projector application execution state (470). After step 470, in case the command signal is inputted from the headset 200 according to the first embodiment of the present invention, the controller can recognize this as a projector application control command signal and projects the next slide or can terminate the projector application. As a result of the determination of step 450, in case the call connection request signal is not received from headset, the controller 180 does not perform the call connection process and continually maintains the projector application execution state at step 470.

Similarly, after step 470, in case a command signal is inputted from the headset 200 according to the first embodiment of the present invention, the controller 180 can recognize this as a projector application control command signal and project the next slide or terminate the projector application. In case the call processing mode is set as the call connection mode at step 430, the controller 180 controls the Bluetooth module unit 150 to transmit a signal which informs that the call is received, to the headset 200 (440). Then, the controller 180 determines whether the call connection request signal is received from the headset (450). In case the call connection request signal is received, the controller 180 connects the call (460), and terminates the projector application which is being executed. Then, if a command signal is inputted from the headset 200, the controller 180 recognizes this as a normal control command of portable terminal 100, and can terminate the call function or can perform the function of executing the voice recognition function.

As a result of the determination of step 450, in case the call connection request signal is not received from headset, the controller 180 continually maintains the projector application execution state and, thereafter, in case command signal is inputted from the headset 200, the controller 180 recognizes this as a projector application control command signal. In case the call processing mode is set as the call interrupt mode at step 430, the controller 180 omits the process of step 440 to step 460 and continually maintains the projector application execution state (470). Then, if a command signal is inputted from the headset 200, the controller 180 recognizes this as the projector application control command signal. In the second embodiment of the present invention, when the call is received in the projector application execution state, the call and the projector application are controlled according to the set call processing mode. The user can proceed the call in the projector application execution state by using the headset.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method comprising:
receiving, at an electronic device including a projector, an incoming call while the projector is executing;
determining a call processing mode of the electronic device from a plurality of call processing modes including a first processing mode and a second processing mode;
processing the incoming call based at least in part on the call processing mode, by:
connecting the incoming call if the call processing mode is the first processing mode, while maintaining the execution of the projector; and
rejecting the incoming call if the call processing mode is the second processing mode, while maintaining the execution of the projector.

2. The method of claim 1, wherein the plurality of call processing modes further comprise a third processing mode, and wherein the processing the incoming call comprises:
connecting the incoming call and terminating the execution of the projector if the call processing mode is the third mode.

3. The method of claim 1, wherein the call processing mode is set based at least in part on a user selection.

4. The method of claim 1, wherein the maintaining comprises:
changing a slide to be projected based at least in part on a user input.

5. The method of claim 4, wherein the changing comprises:
receiving the user input via a further electronic device external to the electronic device.

6. The method of claim 5, wherein the further electronic device comprises a headset.

7. The method of claim 6, wherein the user input comprises at least one of an attention bluetooth voice recognition activation (AT+BVRA) signal or an attention bluetooth last dialed number (AT+BLDN) signal.

8. The method of claim 1, further comprising:
setting, in response to a user input, the call processing mode before the receiving of the incoming call.

9. The method of claim 8, wherein the setting comprises:
presenting, via the electronic device, a call processing mode setting menu including a first menu item corresponding to the first mode and a second menu item corresponding to the second mode.

10. An apparatus comprising:
a projector configured to project at least one content; and
a controller configured to:
receive an incoming call while the projector is executing;
determine a call processing mode of the apparatus from a plurality of call processing modes including a first processing mode and a second processing mode; and
process the incoming call based at least in part on the call processing mode, by:
connecting the incoming call if the call processing mode is the first processing mode, while maintaining the execution of the projector; and
rejecting the incoming call if the call processing mode is the second processing mode, while maintaining the execution of the projector.

11. The apparatus of claim 10, wherein the content comprises an image, a video, a document, or content of an application.

12. The apparatus of claim 10, wherein the plurality of call processing modes further comprise a third processing mode, and wherein the controller is configured to:
connect the incoming call and terminate the execution of the projector as part of the connecting if the call processing mode is the third processing mode.

13. The apparatus of claim 10, wherein the call processing mode is set based at least in part on a user selection.

14. The apparatus of claim 10, wherein the controller is configured to set, in response to a user input, the call processing mode before the receiving of the incoming call.

15. The apparatus of claim 14, wherein the controller is configured to present a call processing mode setting menu including a first menu item corresponding to the first mode and a second menu item corresponding to the second mode.

16. A non-transitory machine-readable storage device storing instructions that, when executed by one or more processors, cause the one or more processors to perform operations comprising:
receiving, at an electronic device including a projector, an incoming call while the projector is executing;
determining a call processing mode of the electronic device from a plurality of call processing modes including a first processing mode and a second processing mode;
processing the incoming call based at least in part on the call processing mode, by:
connecting the incoming call if the call processing mode is the first processing mode, while maintaining the execution of the projector; and
rejecting the incoming call if the call processing mode is the second processing mode, while maintaining the execution of the projector.

* * * * *